April 10, 1928.

C. B. CUSHWA 1,665,299

PALLET AND METHOD OF MAKING THE SAME

Filed Jan. 10, 1925    3 Sheets-Sheet 1

INVENTOR
Charles B. Cushwa,
by Byrnes, Stebbins & Parmelee,
his attys.

April 10, 1928.
C. B. CUSHWA
1,665,299
PALLET AND METHOD OF MAKING THE SAME
Filed Jan. 10, 1925  3 Sheets-Sheet 2
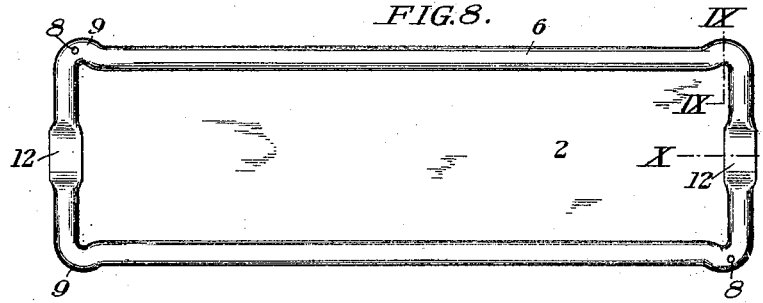
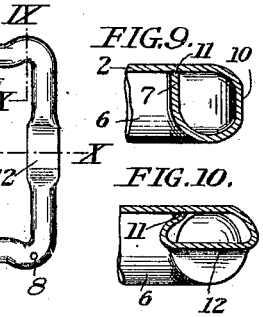
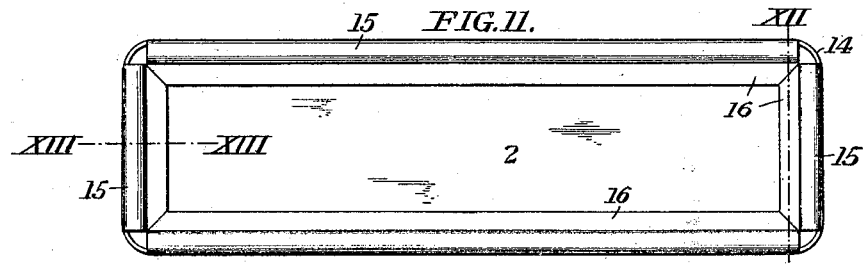
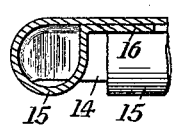
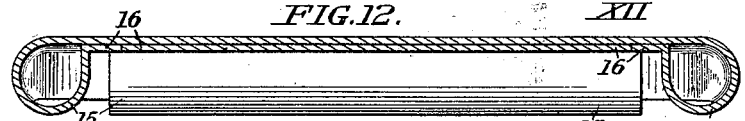
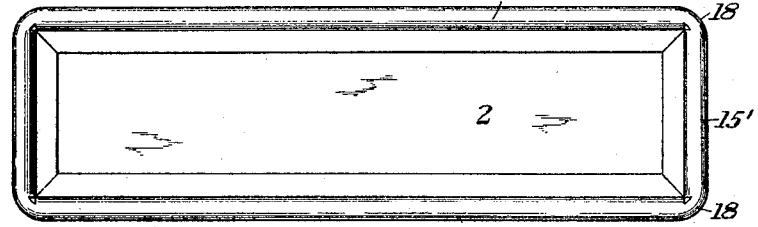
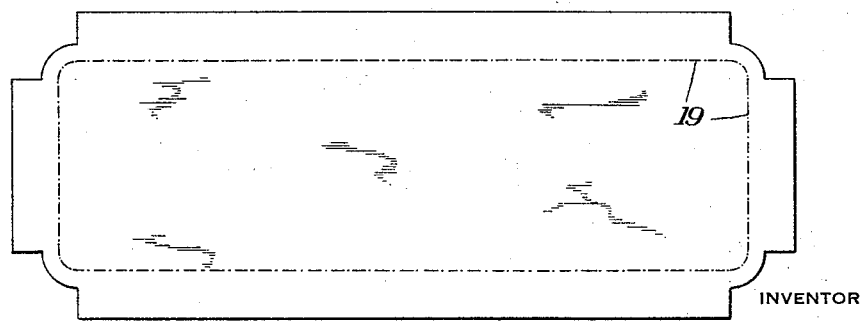
INVENTOR
Charles B. Cushwa,
by Byrnes, Stebbins & Parmelee,
his attys.

April 10, 1928.  
C. B. CUSHWA  
1,665,299  
PALLET AND METHOD OF MAKING THE SAME  
Filed Jan. 10, 1925  
3 Sheets-Sheet 3
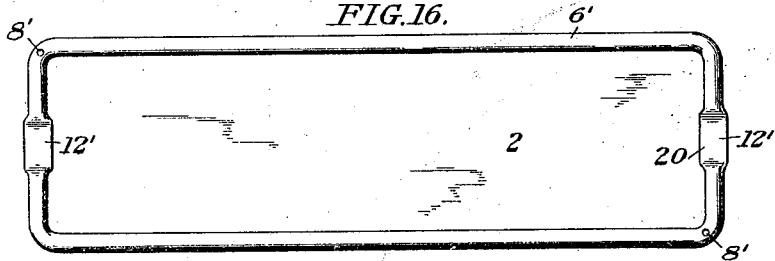
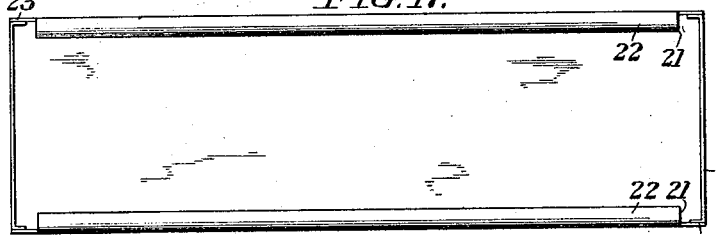
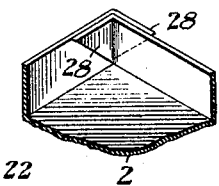
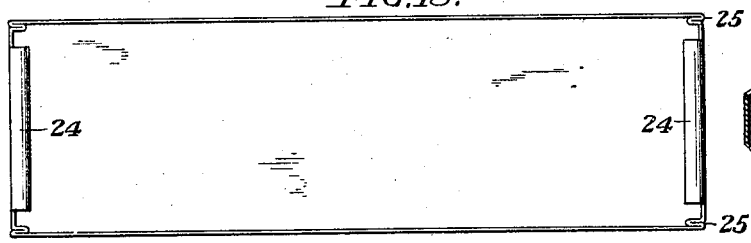
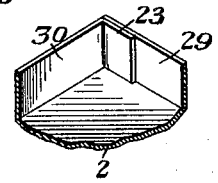
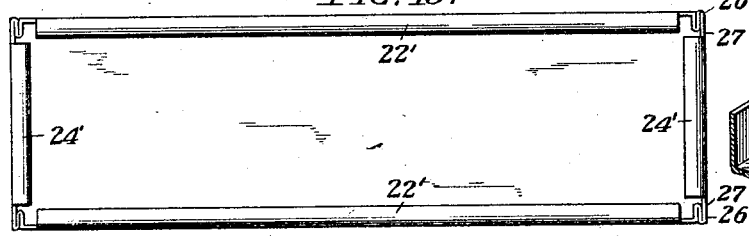
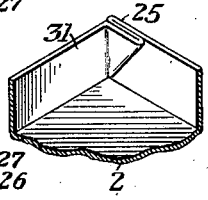
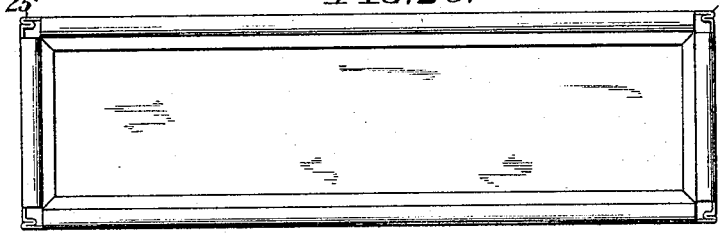
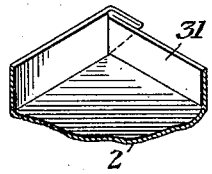

Patented Apr. 10, 1928.

1,665,299

UNITED STATES PATENT OFFICE.

CHARLES B. CUSHWA, OF YOUNGSTOWN, OHIO, ASSIGNOR TO THE COMMERCIAL SHEARING AND STAMPING COMPANY, OF YOUNGSTOWN, OHIO, A CORPORATION OF OHIO.

PALLET AND METHOD OF MAKING THE SAME.

Application filed January 10, 1925. Serial No. 1,537.

The present invention relates broadly to pallets, and more particularly to pallets of the character adapted for use in the manufacture of bricks, although the utility of the invention is not limited in this respect.

In the art to which this invention relates, it is customary at the present time to utilize sheet metal pallets for the purpose of supporting the bricks during the formation thereof and for facilitating the transfer of the formed bricks to a conveyor, kiln, or the like. As usually constructed, such sheet metal pallets have been reinforced by downwardly rolling or bending the ends or sides, or both. This reinforcing roll or flange, as generally provided, is discontinuous at the corners thereby rendering the pallet capable of distortion or warping about its diagonals. Furthermore, there is always a possibility of relative movement between the inner edge of the roll and the body of the pallet which considerably reduces the efficiency of the roll or flange as a rigid reinforcing means. A pallet of this nature will not maintain its upper surface flat enough to form a perfect brick if subjected for any extended length of time to the abusive treatment of pressing and transferring operations attending the manufacture of bricks.

As ordinarily provided, these pallets are subject to another objection. One of the most troublesome features of brick making is the difficulty of obtaining uniform drying of the bricks throughout the drying racks. Heretofore it has been common practice to depend upon the operator to space the pallets apart to permit air currents to pass between them. It can readily be understood that under such conditions erratic manipulation of the pallets may result and as a consequence the bricks interiorly located on the racks may be imperfectly dried.

The present invention contemplates an improved form of pallet wherein substantially uniform strength is obtained throughout the entire body by reason of a flange or bead which may be continuous at the corners. It is further provided that a tubular form of beading may be so utilized that the upper inner edge thereof is secured to the body of the pallet, preferably by welding, galvanizing, or the like.

A further object of the present invention, in accordance with one embodiment thereof, is the provision of means for spacing adjacent pallets a predetermined minimum distance, thereby insuring unimpeded air circulation between the pallets independent of the care exercised by the operator. Such spacing means is preferably in the form of protuberances from the corners of the pallet formed by projecting the bead or reinforcing flange beyond the normal periphery of the pallet.

It has been common practice in the art to which the present invention relates to galvanize the metal and then shape the same. Not infrequently the dies injure the coating, forming weak spots for oxidation. The present invention also contemplates overcoming this objection and obtaining further advantages from the galvanizing operation.

In the accompanying drawings there are shown, for purposes of illustration only, certain preferred embodiments of the present invention, it being understood that the drawings do not define the limits of the invention, as changes in the constructions disclosed therein and the method of making the same may be made without departing from the spirit of the invention or the scope of my broader claims.

In the drawings:

Figure 8 is an inverted plan view of a pallet provided with spacing projections on the corners and having the end beads crushed to permit the operator to slip his hand under the pallet;

Figure 9 is a detail sectional view to enlarged scale on the line IX—IX of Figure 8, showing one type of welded joint;

Figure 10 is a cross sectional view to enlarged scale on the line X—X of Figure 8, illustrating the crushed end beading;

Figure 11 illustrates a pallet similar to Figure 6 but provided with a different type of joint between the beading edge and the pallet body;

Figure 12 is a cross sectional view on the line XII—XII of Figure 11;

Figure 13 is a cross sectional view on the line XIII—XIII of Figure 11, further illustrating the joint between the edge portion of the bead and the body of the pallet;

Figure 14 is a view similar to Figure 11, the pallet being shown as having the roll of the bead carried continuously about the periphery of the pallet;

Figure 15 illustrates the blank used in the construction of the pallet shown in Figure 14, the outline of the finished pallet being shown in chain line;

Figure 16 is similar to Figure 8, embodying the continuous roll and crushed end beads, but not provided with the projecting spacing means on the corners;

Figures 17, 18, 19 and 20 correspond respectively to Figures 1, 3, 6 and 11, but illustrate a pallet having square corners, different forms of corners being shown in the different figures; and Figures 21, 22, 23 and 24 are perspective views on an enlarged scale, illustrating in detail different forms of corners.

Figure 1:
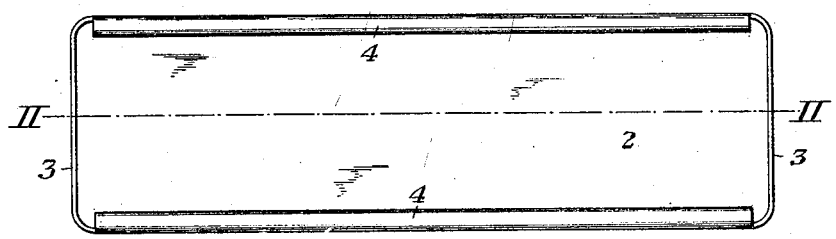
Figure 1 is an inverted plan view of one form of pallet embodying the present invention.
Figure 2:
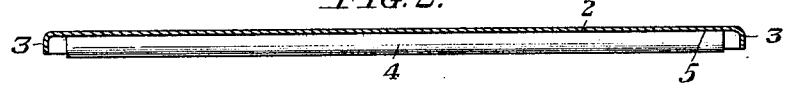
Figure 2 is a longitudinal sectional view on the line II—II of Figure 1, the pallet being shown in its normal supporting position.

Referring first to Figures 1 and 2, there is shown a pallet comprising a body portion 2 having formed thereon a continuously extending downwardly projecting flange 3. Along substantially the entire side portions of the body 2, the flange 3 is rolled inwardly and upwardly to form a reinforcing means 4 of substantially circular cross section, the inner edge 5 of which preferably abuts the body portion 2 of the pallet to which it may be secured by welding, brazing, or the like. In practice I have found that galvanizing the pallets after forming effects a very efficient weld between the inner edge 5 of the bead and the body portion 2, increasing the strength materially, as well as obliterating any die marks. This is the preferred manner of effecting the weld, as galvanizing is essential to the life of the pallet, and therefore by galvanizing after forming, not only is the pallet uniformly coated, but without any additional expense the welding is effected.

Figure 3:
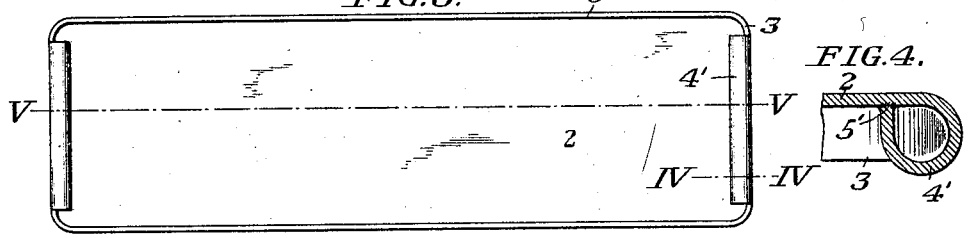
Figure 3 is a view similar to Figure 1, illustrating a modified form of the invention.
Figure 4:
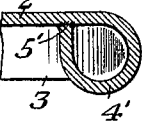
Figure 4 is a cross sectional view to enlarged scale on the line IV—IV of Figure 3.
Figure 5:
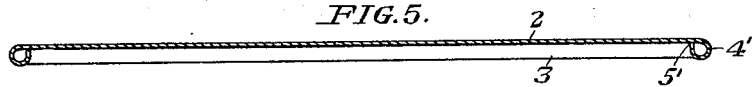
Figure 5 is a view similar to Figure 2, taken on the line V—V of Figure 3.

In Figure 3 there is shown a pallet having the flange 3 rolled to form a tubular reinforcing means 4' along the ends of the pallet. This reinforcing means 4' may have its inner edge 5' welded to the body portion 2, as illustrated in Figure 4, preferably in the manner described.

Figure 6:
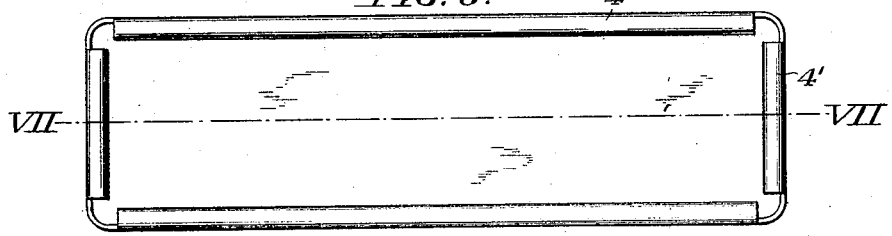
Figure 6 is an inverted plan view of a pallet embodying the present invention as incorporated in both Figures 1 and 3.
Figure 7:
Figure 7 is a longitudinal sectional view on the line VII—VII of Figure 6.

Figures 6 and 7 illustrate a pallet embodying both of the reinforcing means 4 and 4' found in Figures 1 and 2 respectively, presenting a pallet of great strength and rigidity, with a comparatively smooth lower surface facilitating sliding of the pallet.

Still greater strength is to be found in the pallet shown in Figure 8, wherein a tubular reinforcing means 6 extends continuously about the periphery of the pallet. As shown in Figure 9, the inner edge 7 of this bead 6 abuts the body 2 of the pallet and is secured thereto preferably by galvanizing, as described, the spelter completely filling the joint. To provide for draining the excess spelter from within the tubular portion 6, holes 8 are made in the corners. In accordance with the invention it is proposed that the corners be so shaped as to constitute projections 9 extending horizontally outwardly beyond the side edges of the pallet. These projections form spacing means to separate adjacent pallets and thereby provide free air circulation spaces therebetween. While I have shown such spacing means as preferably placed at the corners, due to the fact that it increases the radius of the corners and thereby expedites the formation of the flange, it will be understood that the same may be provided at intervals along the sides. Figure 9 is a cross sectional view through one of the projections 9 and shows the outer edge 10 flattened to provide plane contact between adjacent pallets. Like pallets previously described, the inner edge 11 is preferably secured to the body 2 of the pallet by galvanizing after forming.

Greater ease of manipulation is provided for in this pallet by crushing the tubular reinforcing means 6 along the middle portion 12 of the ends to permit the operator to slip his hand between the pallet support and the pallet. This feature is better illustrated in the cross sectional view in Figure 10, the hand grip thus provided being free from sharp edges or corners.

In Figure 11 there is illustrated a modification of the pallet shown in Figure 6. This pallet is preferably comprised of a body portion 2 terminating in a downwardly projecting flange 14 which extends continuously about the periphery of the pallet. This flange is formed into a roll or tubular reinforcing means 15 which extends substantially the entire length of the sides and ends. The inner edge of the roll 15 has turned thereon a flange 16 which abuts the body portion 2 and is secured thereto, preferably by spot-welding, galvanizing, or both. The substantial nature of this construction is evident from Figure 12. Much strengthening support is given the body of the pallet by reason of contact with the flanges 16, and relative movement between the inner edges of the roll 15 and the body pallet is rendered impossible by the large areas so welded.

Figure 14 shows a pallet like that shown in Figure 12, but having additional strength provided by extending the roll 15' continuously, in so far as is possible, about the corners 18. The blank from which this pallet is formed is shown in Figure 15, the outline of the finished pallet being shown by chain lines 19.

The pallet illustrated in Figure 16 is constructed similarly to that shown in Figure 8, the inner edge being welded to the body 2 by galvanizing or otherwise. This pallet, however, is shown without spacing means for separating adjacent pallets, such spacing being left to the skill of the operator. Hand holds 20 are provided by crushing the tubular reinforcing means 6' along the middle portion 12' of the ends. Inasmuch as this reinforcing means 6' is preferably a continuously extending closed tube, holes 8' are provided for draining the excess galvanizing from the interior of the tubes.

Figure 17 illustrates a pallet similar to that shown in Figure 1, the edge portions 21 of the longitudinally extending tubular reinforcing means 22 being secured to the body portion 2 as before described, the corners 23 being formed as shown in Figure 22 by cutting away the excess metal and securing the edge portions together. This securing may be obtained solely by the operation of galvanizing, or by separately welding, or both.

Figure 18 shows a pallet embodying the invention with the roll portions 24 extending substantially the length of the ends, the corners 25 being formed as shown in Figure 23 by folding the excess metal into a wedge shaped fold and welding. In Figure 19 there is shown a pallet embodying reinforcing means 22' and 24' as illustrated in Figures 17 and 18, and provided with a corner joint 26 wherein the folded metal extends along the end flange 27 of the pallet. This joint 26 is similar to that shown in Figure 18 except for the lay of the fold. The pallet illustrated in Figure 20 is a modification of the pallet shown in Figure 11, and for a detail of the tubular reinforcing means and method of joining the same to the body portion, reference may be had to Figure 13. The corner joints 25', however, are illustrated in Figure 23, the folds being along the sides of the pallet.

It will be understood that the pallets shown in Figures 17 to 20 inclusive are not dependent upon the particular form of corner joint employed for their novel construction, for any of a number of types similar to those illustrated in Figures 20 to 24 inclusive may be employed at random without departing from the spirit of the invention.

Figure 21 illustrates a joint wherein the metal is cut and a portion of the excess 28 resulting from flanging the body 2 is welded to both the side and end flanges. In Figure 22 there is shown a joint wherein the excess metal is entirely clipped from one flange 29, and the excess remaining on the other flange 30 is bent and welded onto the first mentioned flange 29.

In Figures 23 and 24 there are shown two types of folded joints, the excess metal formed by flanging the body portion 2 being folded and welded to one of the flanges 31. In Figure 23 the fold is placed inside the flange 31, thereby presenting a smooth outer surface, desirable in some cases. The type illustrated in Figure 24 may be more desirable in some constructions, however, because no substantial tensile stress can be imparted to the weld in use, thus attaining great strength.

Throughout the claims the expression "welded" is used in its generic sense as definitive not only of the usual meaning but also of the attachment produced by galvanizing after forming.

The broad features of construction of the pallet shown herein are claimed in my copending application Serial No. 720,082, filed June 14, 1924.

The advantages of the present invention arise from the provision of a pallet having a reinforcing means continuous at the corners, such reinforcing means being preferably in the form of a roll. Further advantages arise from the provision of a pallet so designed that the upper inner edge of the reinforcing roll is secured to the body of the pallet, resulting in an extremely rigid construction. Furthermore, decided advantages accure from the provision of means for spacing adjacent pallets independent of the operator.

Important results are obtained by galvanizing the pallet after forming, thereby obliterating any die marks made during the formation thereof, efficiently welding adjacent portions of the pallet together and preventing the possibility of weak or uncoated portions. Advantages likewise arise from the provision of hand holds at the ends of the pallet whereby the operator is enabled to pick up the pallet from a flat surface.

A pallet as herein constructed is extremely rigid, and at the same time light. It is easily manipulated in that it may be readily picked up and adjacent pallets automatically space themselves. It is serviceable and tends to remain true because the manner of reinforcing opposes any tendency to warp, or twist from the normal either transversely, longitudinally or along the diagonals.

I claim:

1. As an article of manufacture, a pallet comprising a body portion having a continuously extending downwardly projecting peripheral reinforcing means formed thereon, and secondary reinforcing means extending longitudinally a substantial part of the length of at least one side of the body portion and formed by rolling the first mentioned means inwardly and upwardly so that the upper inner edge thereof abuts the body portion, said upper inner edge being welded to said body portion, substantially as described.

2. As an article of manufacture, a pallet comprising a body portion having a continuously extending downwardly projecting peripheral reinforcing means formed thereon, and secondary reinforcing means extending laterally a substantial part of the length of at least one end edge of the body portion and formed by rolling the first mentioned means inwardly and upwardly so that the upper inner edge thereof abuts the body portion, said upper inner edge being welded to said body portion, substantially as described.

3. As an article of manufacture, a pallet comprising a body portion having a continuously extending downwardly projecting peripheral reinforcing means formed thereon, and secondary reinforcing means extending longitudinally a substantial part of the length of the side edges of the body portion and laterally a substantial part of the length of the end edges of the body portion and formed by rolling inwardly and upwardly the first mentioned means so that the upper inner edge thereof abuts the body portion, said upper inner edge being welded to said body portion, substantially as described.

4. As an article of manufacture, a pallet having a continuously extending downwardly projecting peripheral flange and a tubular reinforcing means formed by rolling at least a portion of said flange inwardly and upwardly so that the upper inner edge thereof abuts the body portion, said upper inner edge being secured to said body portion by galvanizing, substantially as described.

5. As an article of manufacture, a pallet having a body portion and continuously extending tubular reinforcing means on the periphery thereof, said reinforcing means being formed by rolling the edge portions of said pallet downwardly and inwardly until the inner edge thereof abuts the body of said pallet, said means being secured to the body by galvanizing, the tubular reinforcing means being flattened or crushed to form a hand hold, substantially as described.

6. As an article of manufacture, a pallet having a continuously extending downwardly projecting peripheral reinforcing flange, and means for spacing adjacent pallets, said spacing means being formed by lateral outward projection of said reinforcing flange, substantially as described.

7. As an article of manufacture, a pallet having a top and a downwardly projecting peripheral reinforcing flange which extends continuously around the top, and means for spacing adjacent pallets, said spacing means being formed by lateral outward projection of said reinforcing flange in at least two portions of the side edges of said pallet, substantially as described.

8. As an article of manufacture, a pallet having a top and a downwardly projecting tubular reinforcing means which extends continuously around the top, and means for spacing adjacent pallets, said spacing means being formed by lateral outward curvature of said tubular reinforcing means, substantially as described.

9. As an article of manufacture, a pallet having a top and a downwardly projecting tubular reinforcing means which extends continuously around the top, and means for spacing adjacent pallets, said spacing means being formed by lateral outward curvature of said tubular reinforcing means in at least two portions of the side edges of said pallet, substantially as described.

10. As an article of manufacture, a pallet having a top and a tubular reinforcing means on the periphery thereof, which reinforcing means extends continuously around the top, said reinforcing means being formed by rolling the edge portions of said pallet downwardly and inwardly until the inner edge thereof abuts the body of said pallet, said inner edge being secured to the pallet body by galvanizing, the tubular reinforcing means being flattened or crushed to form a hand hold, and means for spacing adjacent pallets, said spacing means comprising lateral outward curvatures of said tubular reinforcing means, substantially as described.

11. As an article of manufacture, a pallet having a top and a downwardly projecting peripheral reinforcing flange which extends continuously around the top, means for spacing adjacent pallets, said spacing means comprising lateral outward projections of said reinforcing flange, said reinforcing flange being crushed or flattened to form a hand hold, substantially as described.

12. As an article of manufacture, a pallet having a rolled peripheral flange, a portion of such flange being flattened or crushed in such manner that the height of the portion is reduced in its entirety to form a hand hold.

13. As an article of manufacture, a pallet having a body portion and an edge portion which extends downwardly, then beneath the pallet and then upwardly to terminate substantially against the body portion of the pallet, a portion of such reinforcing edge being deformed to serve as a hand hold.

In testimony whereof I have hereunto set my hand.

CHARLES B. CUSHWA.